United States Patent
Soga et al.

(10) Patent No.: US 6,193,330 B1
(45) Date of Patent: Feb. 27, 2001

(54) ELECTRICALLY CONTROLLED BRAKE SYSTEM SHUT DOWN BY TURN OFF OF IGNITION SWITCH WITH DELAY TIME

(75) Inventors: Masayuki Soga; Yutaka Ohnuma, both of Susono; Junichi Sakamoto, Gotemba, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/217,839

(22) Filed: Dec. 22, 1998

(30) Foreign Application Priority Data

Feb. 19, 1998 (JP) .................................................. 10-054316

(51) Int. Cl.⁷ ...................................................... B60T 8/88
(52) U.S. Cl. ........................ 303/155; 303/113.4; 303/87
(58) Field of Search ................................ 303/155, 113.4, 303/20, 3, 15, 84; 188/353

(56) References Cited

U.S. PATENT DOCUMENTS

| | | | |
|---|---|---|---|
| 3,684,049 | * 8/1972 | Kimura | 303/89 |
| 3,852,613 | * 12/1974 | Wienecke | 303/89 |
| 4,667,471 | * 5/1987 | Fulmer et al. | 303/114.1 |
| 4,934,492 | * 6/1990 | Hayes-Sheen | 188/353 |
| 5,975,648 | * 11/1999 | Rump | 303/3 |

FOREIGN PATENT DOCUMENTS

| | | |
|---|---|---|
| 4421 774 A1 | 1/1996 | (DE) . |
| 6-127317 | 5/1994 | (JP) . |
| 8-2390 | 1/1996 | (JP) . |

* cited by examiner

*Primary Examiner*—Matthew C. Graham
(74) *Attorney, Agent, or Firm*—Oliff & Berridge, PLC

(57) ABSTRACT

An electrically controlled brake system for a vehicle, wherein an electric control device of the system has a device for detecting a changeover of an ignition switch from an on-state to an off-state. The electrically controlled brake system also includes a device for detecting a depression of a brake pedal beyond a predetermined depth. The brake system has a device for counting a predetermined time duration when the ignition switch changeover detection device detects a changeover of the ignition switch from the on-state to the off-state. Furthermore, the electrically controlled brake system includes a device for shutting down the electrically controlled brake system when the time count device has counted the predetermined time duration and the brake pedal depression detection device fails to detect the brake pedal depression beyond the predetermined depth.

3 Claims, 3 Drawing Sheets

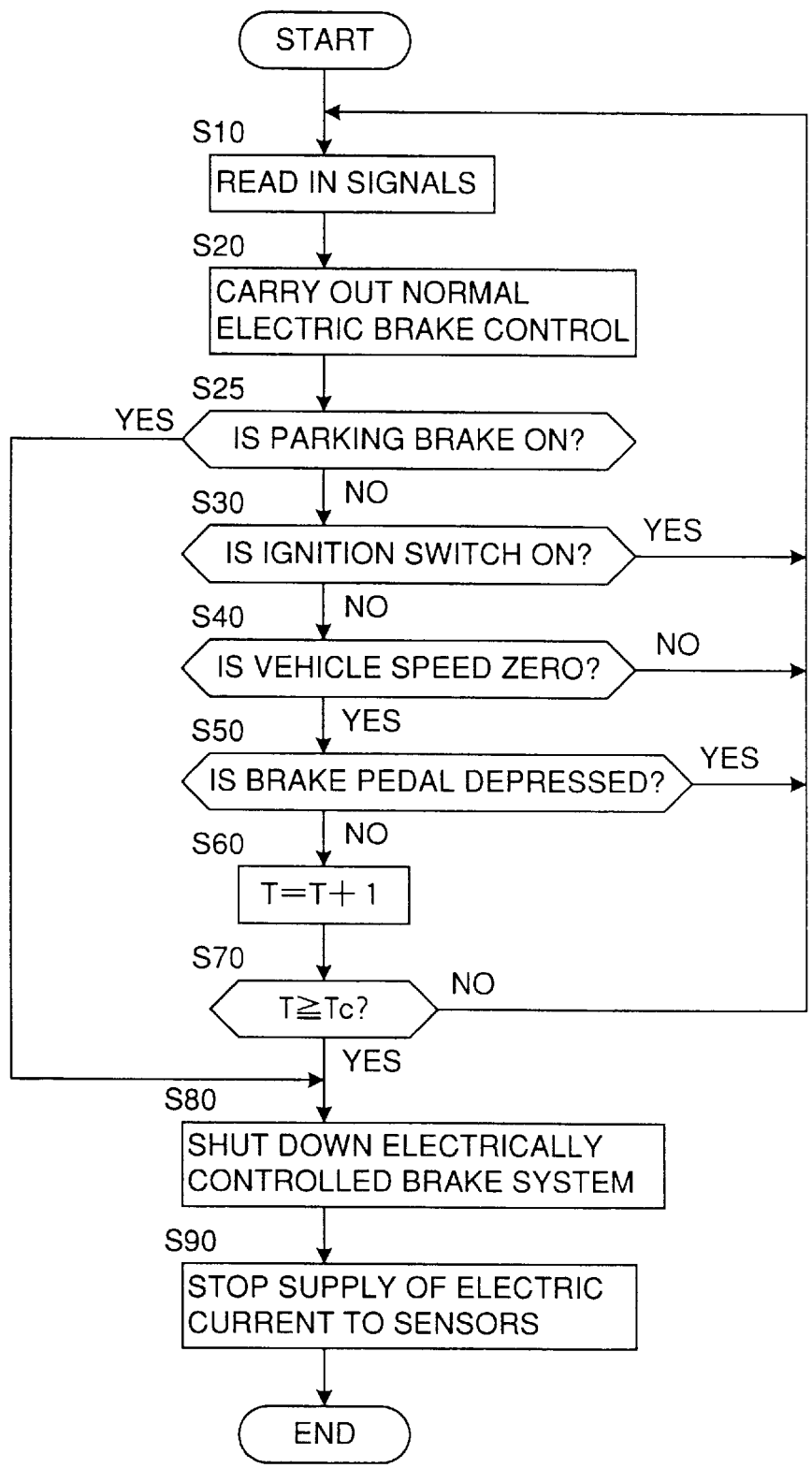

ELECTRICALLY CONTROLLED BRAKE SYSTEM SHUT DOWN BY TURN OFF OF IGNITION SWITCH WITH DELAY TIME

BACKGROUND OF THE INVENTION

1. Field of the Invention

The present invention related to an electrically controlled brake system of a vehicle such as an automobile, and more particularly, to an improvement of an electrically controlled brake system of a vehicle so as to be shut down with a more prudent confirmation of the driver's will for resting the vehicle.

2. Description of the Prior Art

Generally in a vehicle such as an automobile, the ignition switch controls the supply of electric currents to all parts and devices of the vehicle adapted to be powered by its battery, except those devices such as time pieces, retention memories of a micro-computer and the like which need a continuous supply of an electric current and are therefore directly connected to the battery, so that the turn off of the key of the ignition switch instantly disables all those electrically operated parts and devices.

In this connection, however, it has been proposed by Japanese Patent Laid-open Publication based upon German Patent Application P 4421774.9 to prevent the ignition switch being turned off when a changeover valve of the brake system is being operated. Further, in Japanese Patent Laid-open Publication 6-127317 it has been proposed to let the motor of a pressure booster of the brake system be started by the brake pedal being depressed even when the ignition switch has been turned off.

SUMMARY OF THE INVENTION

It would happen more often in future that a driver stops his or her modern automobile incorporating a computer-controlled electric brake system on a roadside, removes his or her foot from the brake pedal, and turns off the ignition switch, before setting on the parking brake, without noticing that the place is slightly sloped. Then, in a few seconds, the automobile will start to creep forward or rearward. If the automobile is equipped with an auto brake startup system such as proposed by the above-mentioned Japanese Patent Laid-open Publication 6-127317, when the driver notices the creeping of the automobile and hurries to depress the brake pedal again but without turning on the ignition switch, the electric brake system will effectively operate. However, it will be more prudent on such an occasion that the brake system is prepared for such a re-operation from the beginning, so as not to need any rush startup of the electrically controlled brake system which may still include hydraulic means such as an oil pump having an inertia substantially great as compared with electricity.

Therefore, it is an object of the present invention to provide an improved electrically controlled brake system of a vehicle such as an automobile, so that it has a higher adaptability to such an occasion that a re-operation of the brake system is required just after the ignition switch was turned off.

According to the present invention, the above-mentioned object is accomplished by an electrically controlled brake system of a vehicle such as an automobile having a plurality of wheels, and an ignition switch adapted to be changed over between an on-state for operating the vehicle and an off-state for resting the vehicle, the electrically controlled brake system comprising:

means for applying a braking force to at least one of the plurality of wheels according to a supply of energy thereto;

means for generating the energy to be supplied to the braking force application means;

a brake pedal adapted to be depressed by a driver; and means for electrically controlling operation of the energy generation means and the supply of the energy generated thereby to the braking force application means of at least the one wheel according to a depth of the depression of the brake pedal by the driver;

wherein the electric control means comprises means for detecting a changeover of the ignition switch from the on-state to the off-state, means for detecting a depression of the brake pedal by the driver beyond a predetermined depth, means for counting a predetermined time duration when the ignition switch changeover detection means detect a changeover of the ignition switch from the on-state to the off-state, and means for shutting down the electrically controlled brake system when the time count means has counted the predetermined time duration with the brake pedal depression detection means detecting no depression of the brake pedal beyond the predetermined depth.

The electrically controlled brake system of the abovementioned construction may further be so modified that, when the vehicle comprises means for detecting vehicle speed, the electrically controlled brake system shut down means shut down the electrically controlled brake system on a further condition that the vehicle speed detected by the vehicle speed detection means is zero.

Further, the electrically controlled brake system of the abovementioned construction may further be so modified that, when the vehicle comprises a parking brake adapted to be actuated by an energy not dependent on the energy generation means, while the electrically controlled brake system further comprises means for detecting a substantial actuation of the parking brake, the electrically controlled brake system shut down means override the time count means counting the predetermined time duration for shutting down the electrically controlled brake system when the parking brake actuation detection means detect the substantial actuation of the parking brake.

BRIEF DESCRIPTION OF THE DRAWINGS

In the accompanying drawings,

FIG. 3 is a flowchart showing a second embodiment of the present invention in the form of the operation thereof.

DESCRIPTION OF THE EMBODIMENTS

In the following, the present invention will be described in more detail in the form of some preferred embodiments with reference to the accompanying drawings.

Figure 1A:
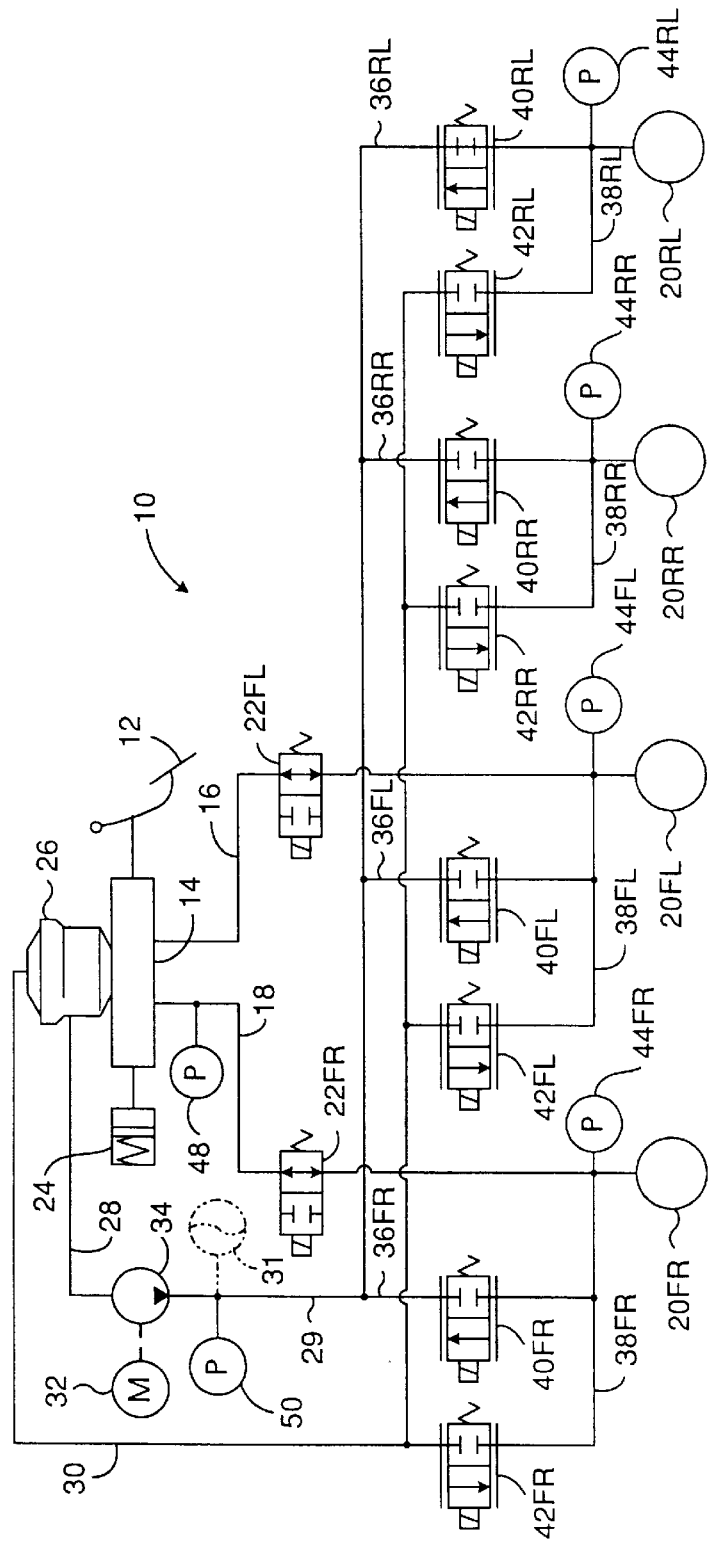
FIGS. 1A and 1B are diagrams showing the hydraulic part and the electrical part, respectively, of an example of an electrically controlled brake system of a vehicle in which the improvement according to the present invention is embodied.

Referring to FIG. 1A, the hydraulic system 10 of a vehicle such as an automobile, constructed still to be hybrid of a conventional hydraulic brake system and an electrically controlled brake system, comprises a brake pedal 12, a master cylinder 14, and four wheel cylinders 20FL, 20FR, 20RL and 20RR of front left, front right, rear left and rear right wheels not shown in the figure. As the conventional hydraulic brake system, the front wheel cylinders 20FL and 20FR are adapted to be supplied with a hydraulic pressure from the master cylinder 14 through passages 16 and 18, respectively, according to a depression of the brake pedal 12 by a driver. Although solenoid-operated changeover valves 22FL and 22FR are provided in the passages 16 and 18, respectively, since these changeover valves are of a normally open type which remains open through when no electric current is supplied thereto, the front wheel cylinders 20FL and 20FR are still always operative according to a depression of the brake pedal by a driver in a state that the ignition switch (diagrammatically shown in FIG. 1B) was turned off, for a further safety. 24 is a stroke simulator, while the master cylinder pressure is monitored by a master cylinder pressure sensor 48.

As the electrically controlled brake system, there is provided a pump 34 to be driven by a motor 32 to draw up a brake fluid from a reservoir 26 through a passage 28 and delivers a pressurized brake fluid in a passage 29. An accumulator 31 may be provided for the pressurized brake fluid supply passage 29. The passage 29 is branched into passages 36FL, 36FR, 36RL and 36RR for supplying the pressurized brake fluid to the front left, front right, rear left and rear right wheel cylinders 20FL, 20FR, 20RL and 20RR, respectively. Normally closed type solenoid-operated changeover valves 40FL, 40FR, 40RL and 40RR are provided in the passages 36FL, 36FR, 36RL and 36RR, respectively. On the other hand, for exhausting the wheel cylinders 20FL, 20FR, 20RL and 20RR, they are connected with passages 38FL, 38FR, 38RL and 38RR, with normally closed type solenoid-operated changeover valves 42FL, 42FR, 42RL and 42RR being provided therein, respectively. The passages 38FL, 38FR, 38RL and 38R are combined into a passage 30 which returns to the reservoir 26. The pressures of the wheel cylinders 20FL, 20FR, 20RL and 20RR are monitored by wheel cylinder pressure sensors 44FL, 44FR, 44RL and 44RR, respectively. The pressure in the passage 29 is monitored by a pump delivery pressure sensor 50.

Figure 1B:
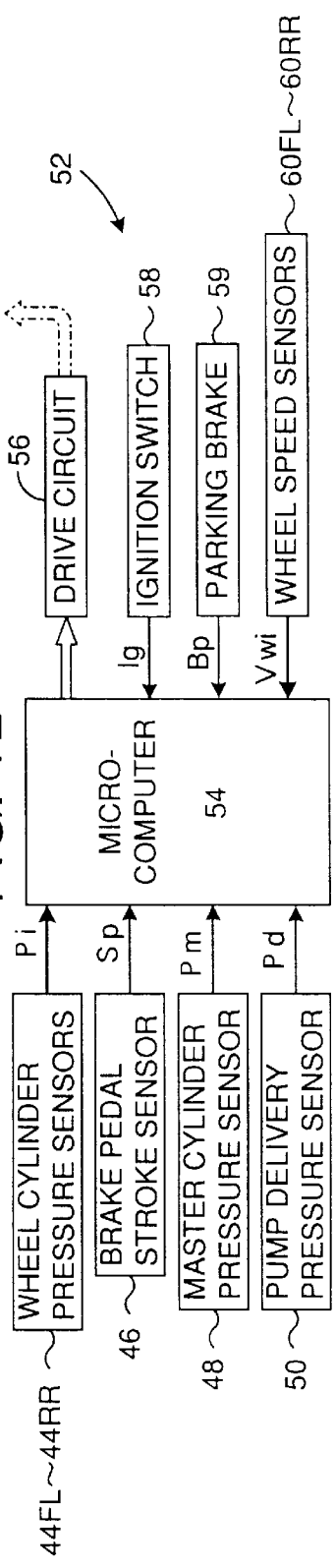

In the electrical part 52 of the brake system shown in FIG. 1B, a principal body of a controller is constructed by a micro-computer 54 which may be of a conventional type having a central processor unit, a read only memory, a random access memory, input and output port means and a common bus interconnecting these elements, though not shown in detail in the figure. The micro-computer is supplied with signals Pi (i=FL, FR, RL and RR) representing the pressures of the corresponding wheel cylinders from the pressure sensors 44FL–44RR, a signal Sp representing the stroke of the depression of the brake pedal 12 from a brake pedal stroke sensor 46, a signal Pm representing the master cylinder pressure from the master cylinder pressure sensor 48, a signal Pd representing the delivery pressure of the pump 34 from the pump deliver pressure sensor 50, a signal Ig indicating whether the ignition switch is turned on or off from an ignition switch 58, a signal Bp indicating whether a parking brake 59 is substantially actuated so as to brake the vehicle against creeping during the absence of the driver, and signals Vwi (i=FL, FR, RL and RR) representing wheel speeds of the front left, front right, rear left and rear right wheels (not shown) from wheel speed sensors 60FL–60RR, respectively. The central processor unit of the microcomputer 54 carries out certain brake control calculations according to the running conditions of the vehicle known from the above-mentioned signals based upon certain calculation programs stored in the read only memory, and timely outputs various control signals to a drive circuit 56 which controls supply or stop of an electric current to the motor 32 for driving the pump 34, and supply or stop of an electric current to each of the solenoid-operated changeover valves 22FL, 22FR, 40FL–40RR, 43FL–42RR.

The basic operations of the hydraulic system shown in FIG. 1A according to a depression of the brake pedal 12, on/off of the pump 34 and changeovers of the changeover valves 22FL, etc. will be obvious to those skilled in the art. In short, when all of the changeover valves are deenergized, the wheel cylinders 20FL and 20FR are substantially directly connected with the master cylinder 14, so that the brake system is operable as a conventional hydraulic brake system. When the electrically controlled brake system is actuated, the pump 34 is operated, the changeover valves 22FL and 22FR are changed over to interrupt the passages 16 and 18, and the changeover valves 40FL–40RR are selectively changed over to supply the brake fluid pressurized by the pump 34 to the corresponding wheel cylinders 20FL–20RR, while the corresponding changeover valves 42FL–42RR are selectively changed over to exhaust the pressure from the corresponding wheel cylinders 20FL–20RR, so as to realize a certain controlled pressure in each of the wheel cylinders 20FL–20RR.

A first embodiment of the electrically controlled brake system according to the present invention will be described with reference to FIG. 2 in the form of the operation thereof.

Figure 2:
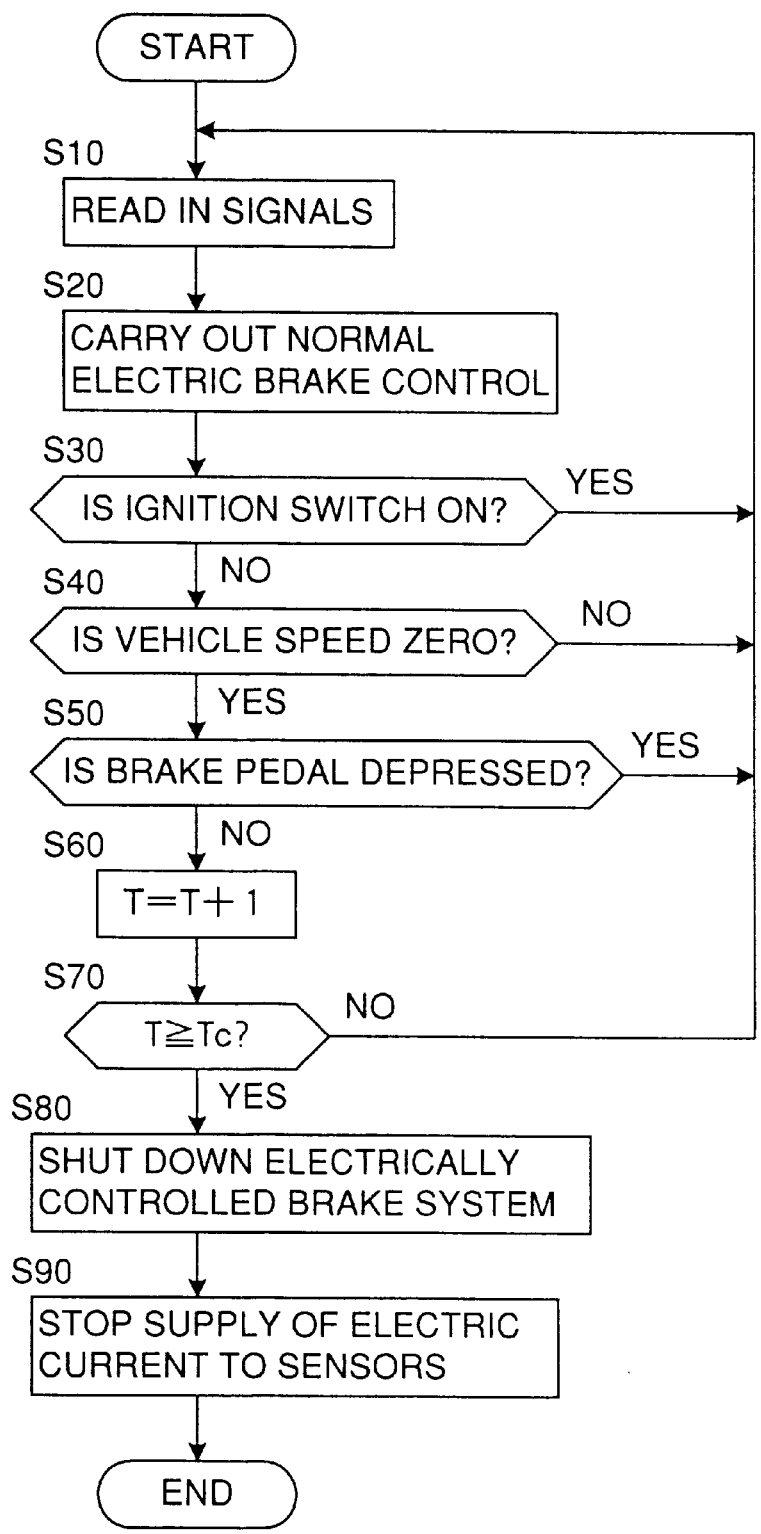
FIG. 2 is a flowchart showing a first embodiment of the present invention in the form of the operation thereof.

When the brake control system is put into operation by a turning on of the ignition switch 58, control operations such as shown by a flow of steps in FIG. 2 are cyclically and repetitively carried out at a cycle time of the order of tens of micro-seconds.

First, in step 10, the signals shown in FIG. 1B are read in.

In step 20, the electrical control of the brake system is carried out according to the operating conditions of the vehicle, as outlined above, in addition to other various automatic brake controls for the purpose of vehicle stability control already known according to a lot of patent applications.

In step 30, it is judged according to the signal Ig from the ignition switch 58 if it is turned on or not, i.e. off. When the answer is yes, the control returns to step 10, whereas when the answer is no, the control proceeds to step 40.

In step 40, it is judged if the vehicle speed detected based upon the wheel speed signals Vwi is zero. When the answer is no, the control returns to step 10, whereas when the answer is yes, the control proceeds to step 50.

In step 50, it is judged according to the signal Sp from the brake pedal stroke sensor 46 if the brake pedal 12 is depressed beyond a predetermined threshold depth which indicates that the driver intends to brake the vehicle. When the answer is yes, the control returns to step 10, whereas if the answer is no, the control proceeds to step 60.

In step 60, time count T, initialized to zero at the start of the control operation as usual in this art, is incremented by 1, and then the control proceeds to step 70.

In step 70, it is judged if the time count T has reached a threshold value Tc predetermined therefor. When the answer is no, the control returns to step 10, whereas when the answer is yes, the control proceeds to step 80.

In step 80, the electrically controlled brake system is shut down such that a power switch of the motor 32, not shown, is turned off, and the solenoid-operated changeover valves 22FL, etc. are all deenergized so as to be returned to the changeover position shown in FIG. 1A.

Therefore, it is only after the lapse of a time corresponding to the time count Tc from the moment of a turning off of the ignition switch by the driver that the electrically controlled brake system is actually shut down by the turning off of the ignition switch. The time count Tc may be appropriately determined to provide a time duration in which drivers will infallibly notice a creeping of the vehicle which would occur on a moderate slope causative of a careless overlook thereof by the drivers.

Thereafter, the control may further proceed to step 90 for stopping the supply of electric current to the sensors 44FL, etc.

FIG. 3 is a flowchart similar to FIG. 2, showing a second embodiment of the electrically controlled brake system according to the present invention in the form of the operation thereof. This second embodiment is different from the first embodiment shown in FIG. 2 only in that step 25 is added between steps 20 and 30, so that there it is judged if the parking brake is on, i.e. substantially actuated so as to brake the vehicle from creeping on a moderate slope which is apt to be overlooked by drivers. In this embodiment, when the answer of step 25 is no, the control proceeds to step 30, whereas when the answer of step 25 is yes, the control bypasses steps 30–70, so as to immediately proceed to step 80. In FIG. 3, the other steps designated by the same step numbers as in FIG. 2 are for carrying out the same functions as in those of FIG. 2, and therefore, further descriptions on those steps will be omitted to avoid a redundancy of the description.

Although the present invention has been described in detail with respect to some preferred embodiments thereof, it will be apparent for those skilled in the art that various modifications are possible with respect to the shown embodiments within the scope of the present invention.

What is claimed is:

1. An electrically controlled brake system of a vehicle having a plurality of wheels, and an ignition switch adapted to be changed over between an on-state for operating the vehicle and an off-state for resting the vehicle, the electrically controlled brake system comprising:

means for applying a braking force to at least one of the plurality of wheels according to a supply of energy thereto;

means for generating the energy to be supplied to the braking force application means;

a brake pedal adapted to be depressed by a driver; and means for electrically controlling operation of the energy generation means and the supply of the energy generated thereby to the braking force application means of at least the one wheel according to a depth of the depression of the brake pedal by the driver;

wherein the electric control means comprises means for detecting a changeover of the ignition switch from the on-state to the off-state, means for detecting a depression of the brake pedal by the driver beyond a predetermined depth, means for counting a predetermined time duration when the ignition switch changeover detection means detect a changeover of the ignition switch from the on-state to the off-state, and means for shutting down the electrically controlled brake system when the time count means has counted the predetermined time duration with the brake pedal depression detection means detecting no depression of the brake pedal beyond the predetermined depth.

2. An electrically controlled brake system according to claim 1, wherein the vehicle comprises means for detecting vehicle speed, and the electrically controlled brake system shut down means shut down the electrically controlled brake system on a further condition that the vehicle speed detected by the vehicle speed detection means is zero.

3. An electrically controlled brake system according to claim 1, wherein the vehicle comprises a parking brake adapted to be actuated by an energy not dependent on the energy generation means, while the electrically controlled brake system further comprises means for detecting a substantial actuation of the parking brake, the electric control means overriding the time count means counting the predetermined time duration for shutting down the electrically controlled brake system when the parking brake actuation detection means detect the substantial actuation of the parking brake.

* * * * *